US012454042B2

(12) United States Patent
Schwertner et al.

(10) Patent No.: US 12,454,042 B2
(45) Date of Patent: Oct. 28, 2025

(54) DRIVING-IN DEVICE

(71) Applicant: Hilti Aktiengesellschaft, Schaan (LI)

(72) Inventors: Wolfram Schwertner, Werdenberg (CH); Dionys Schalbetter, Haag (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 89 days.

(21) Appl. No.: 17/416,250

(22) PCT Filed: Nov. 29, 2019

(86) PCT No.: PCT/EP2019/083020
§ 371 (c)(1),
(2) Date: Jun. 18, 2021

(87) PCT Pub. No.: WO2020/126408
PCT Pub. Date: Jun. 25, 2020

(65) Prior Publication Data
US 2022/0063073 A1 Mar. 3, 2022

(30) Foreign Application Priority Data
Dec. 20, 2018 (EP) .................................... 18214817

(51) Int. Cl.
*B25C 1/00* (2006.01)
*B25C 1/06* (2006.01)
*B25C 7/00* (2006.01)

(52) U.S. Cl.
CPC ................ *B25C 1/008* (2013.01); *B25C 1/06* (2013.01); *B25C 7/00* (2013.01)

(58) Field of Classification Search
CPC .. B25C 1/008; B25C 1/06; B25C 7/00; B25C 1/08; B25C 1/188
See application file for complete search history.

(56) References Cited

U.S. PATENT DOCUMENTS 4,388,073 A 6/1983 Klenk
6,012,622 A 1/2000 Weinger et al.
(Continued)

FOREIGN PATENT DOCUMENTS

CN 1232736 A 10/1999
CN 101287576 A 10/2008
(Continued)

OTHER PUBLICATIONS

International Search Report and Written Opinion in International Application No. PCT/EP2019/083020, mailed Mar. 4, 2020.

*Primary Examiner* — Veronica Martin
(74) *Attorney, Agent, or Firm* — Leydig, Voit & Mayer, Ltd.

(57) ABSTRACT

An apparatus for driving a fastening element into a base material, comprising a power unit and a driving element which is provided driven by the power unit in a driving direction from a starting position into a setting position to drive a fastening element into the base material; a braking element with a contact surface which defines the setting position of the driving element and against which the driving element lies in the setting position; a pressing element which has an end surface which can be pressed in the driving direction onto the base material, wherein, in the driving direction, the end surface and the contact surface are at a distance from each other which defines a driving depth of the fastening element into the base material; and, an adjustment device with which the distance between the end surface and the contact surface can be adjusted.

15 Claims, 4 Drawing Sheets

(56) References Cited

U.S. PATENT DOCUMENTS

| | | | | |
|---|---|---|---|---|
| 6,176,412 | B1 | 1/2001 | Weinger et al. | |
| 6,179,192 | B1 | 1/2001 | Weinger et al. | |
| 6,695,192 | B1 | 2/2004 | Kwok | |
| 6,755,392 | B1 * | 6/2004 | Phillips | B25C 11/00 254/18 |
| 6,851,595 | B1 * | 2/2005 | Lee | B25C 1/008 227/8 |
| 7,318,544 | B2 | 1/2008 | Zahner et al. | |
| 7,341,172 | B2 | 3/2008 | Moore et al. | |
| 7,427,008 | B2 | 9/2008 | Brendel et al. | |
| 7,677,425 | B2 | 3/2010 | Brendel et al. | |
| 7,870,987 | B1 | 1/2011 | Zhang et al. | |
| 8,302,513 | B2 | 11/2012 | Evatt | |
| 8,464,806 | B2 | 6/2013 | Rousson et al. | |
| 9,126,318 | B2 | 9/2015 | Cheung et al. | |
| 9,937,608 | B2 | 4/2018 | Hahn et al. | |
| 10,195,728 | B2 | 2/2019 | Tanji | |
| 11,400,574 | B2 | 8/2022 | Namouz | |
| 2006/0054652 | A1 | 3/2006 | Zahner et al. | |
| 2007/0057006 | A1 | 3/2007 | Moore et al. | |
| 2008/0099526 | A1 | 5/2008 | Brendel et al. | |
| 2008/0185417 | A1 | 8/2008 | Brendel et al. | |
| 2008/0251567 | A1 | 10/2008 | Shkolnikov et al. | |
| 2010/0224038 | A1 | 9/2010 | Evatt | |
| 2010/0325857 | A1 | 12/2010 | Szewe et al. | |
| 2010/0327037 | A1 | 12/2010 | Zhang et al. | |
| 2011/0139849 | A1 | 6/2011 | Rousson et al. | |
| 2011/0297728 | A1 * | 12/2011 | Liang | B25C 7/00 227/142 |
| 2011/0303724 | A1 | 12/2011 | Groer et al. | |
| 2011/0303729 | A1 | 12/2011 | Hahn et al. | |
| 2012/0160889 | A1 * | 6/2012 | Tanji | B25C 1/043 227/142 |
| 2012/0211540 | A1 * | 8/2012 | Kondou | B25C 1/00 227/140 |
| 2013/0119107 | A1 | 5/2013 | Cheung et al. | |
| 2016/0176032 | A1 | 6/2016 | Tanji | |
| 2017/0209990 | A1 * | 7/2017 | Irwin | B25B 21/002 |
| 2017/0361441 | A1 | 12/2017 | Namouz | |

FOREIGN PATENT DOCUMENTS

| | | | |
|---|---|---|---|
| CN | 201217204 | Y | 4/2009 |
| CN | 101823252 | A | 9/2010 |
| CN | 102092030 | A | 6/2011 |
| CN | 202016035 | U | 10/2011 |
| CN | 102528750 | A | 7/2012 |
| CN | 202985516 | U | 6/2013 |
| CN | 105339137 | A | 2/2016 |
| CN | 107520820 | A | 12/2017 |
| EP | 1 403 005 | A1 | 3/2004 |
| EP | 2 269 773 | A2 | 1/2011 |
| EP | 2 269 773 | A3 | 10/2012 |
| EP | 2 591 882 | A2 | 5/2013 |
| EP | 2 591 882 | A3 | 6/2014 |
| JP | S57-51649 | A | 3/1982 |
| JP | 2006-82221 | A | 3/2006 |
| JP | 2007-61981 | A | 3/2007 |
| JP | 2011-11277 | A | 1/2011 |
| JP | 2012-761 | A | 1/2012 |
| KR | 10-2009-0131476 | A | 12/2009 |
| KR | 10-2011-0136725 | A | 12/2011 |
| KR | 10-2016-0057835 | A | 5/2016 |
| SU | 1484546 | A1 | 6/1989 |
| TW | 201504009 | A | 2/2015 |
| TW | 201603969 | A | 2/2016 |
| WO | 2012/111466 | A1 | 8/2012 |

* cited by examiner

DRIVING-IN DEVICE

CROSS-REFERENCE TO RELATED APPLICATIONS

This patent application is the U.S. National Stage of International Patent Application No. PCT/EP2019/083020, filed Nov. 29, 2019, which claims the benefit of European Patent Application No. 18214817.1, filed Dec. 20, 2018, which are each incorporated by reference.

TECHNICAL FIELD

The application relates to an apparatus for driving a fastening element into a base material.

PRIOR ART

In the case of apparatuses of this type, a driving depth of the fastening element into the base material depends on a number of influencing variables and differs in different applications. In order to ensure a desired driving depth, it is known to provide the driving apparatus with a driving depth adjustment device with which a user can adjust the driving depth within a defined range.

SUMMARY OF THE INVENTION

The object is achieved in an apparatus for driving a fastening element into a base material, comprising a power unit and a driving element which is designed preferably as a piston and is driven by the power unit in a driving direction from a starting position into a setting position in order to drive a fastening element into the base material, furthermore comprising a braking element with a contact surface which defines the setting position of the driving element and against which the driving element lies in particular in the setting position, furthermore comprising a pressing element which has an end surface which can be pressed in the driving direction onto the base material, wherein, in the driving direction, the end surface and the contact surface are at a distance from each other which defines a driving depth of the fastening element into the base material, furthermore comprising an adjustment device with which the distance between the end surface and the contact surface can be adjusted, wherein the adjustment device comprises an adjusting element which is connected by means of a first threaded connection to the braking element and by means of a second threaded connection to the pressing element, and therefore rotation of the adjusting element firstly offsets the adjusting element relative to the braking element and relative to the pressing element and secondly offsets the pressing element relative to the braking element. This permits a simple adjustment of the distance between the setting position and the base material, and therefore a driving depth of the fastening element into the base material can be set by a user of the apparatus.

An advantageous embodiment is characterized in that a thread axis of the first threaded connection is oriented in the driving direction. A thread axis of the second threaded connection is likewise advantageously oriented in the driving direction.

An advantageous embodiment is characterized in that the first threaded connection has a right-handed thread and the second threaded connection has a left-handed thread. Alternatively, the first threaded connection has a left-handed thread and the second threaded connection has a right-handed thread. A further advantageous embodiment is characterized in that the first threaded connection has a first thread pitch, and wherein the second threaded connection has a second thread pitch which differs from the first thread pitch. Said measures make it possible in a simple manner for rotation of the adjusting element to offset the pressing element relative to the braking element.

An advantageous embodiment is characterized in that the first threaded connection has a first internal thread and a first external thread, and wherein the second threaded connection has a second internal thread and a second external thread. The adjusting element preferably has the first external thread and/or the second external thread. The adjusting element is particularly preferably designed as a threaded sleeve which is screwed onto the braking element and onto the pressing element.

An advantageous embodiment is characterized in that the apparatus comprises a housing and a pressing sensor which comes into contact with the base material only when the apparatus is pressed in the driving direction against the base material and which can be offset relative to the housing counter to the driving direction between a starting position and a pressing position, wherein the pressing sensor is in the starting position when the apparatus is not pressed against the base material, and wherein the pressing sensor is in the pressing position when the apparatus is pressed against the base material. The pressing sensor in the starting position preferably protrudes beyond the pressing element in the driving direction. Alternatively, the pressing sensor is formed by the pressing element.

An advantageous embodiment is characterized in that the power unit comprises a potential energy store, formed preferably as a spring, for storing potential energy by means of which the driving element is driven, and an energy transmission device for transmitting energy from an energy source to the potential energy store.

EXEMPLARY EMBODIMENTS

Exemplary embodiments of an apparatus for driving a fastening element into a base material are explained in more detail below on the basis of examples with reference to the drawings, in which.

Figure 1:
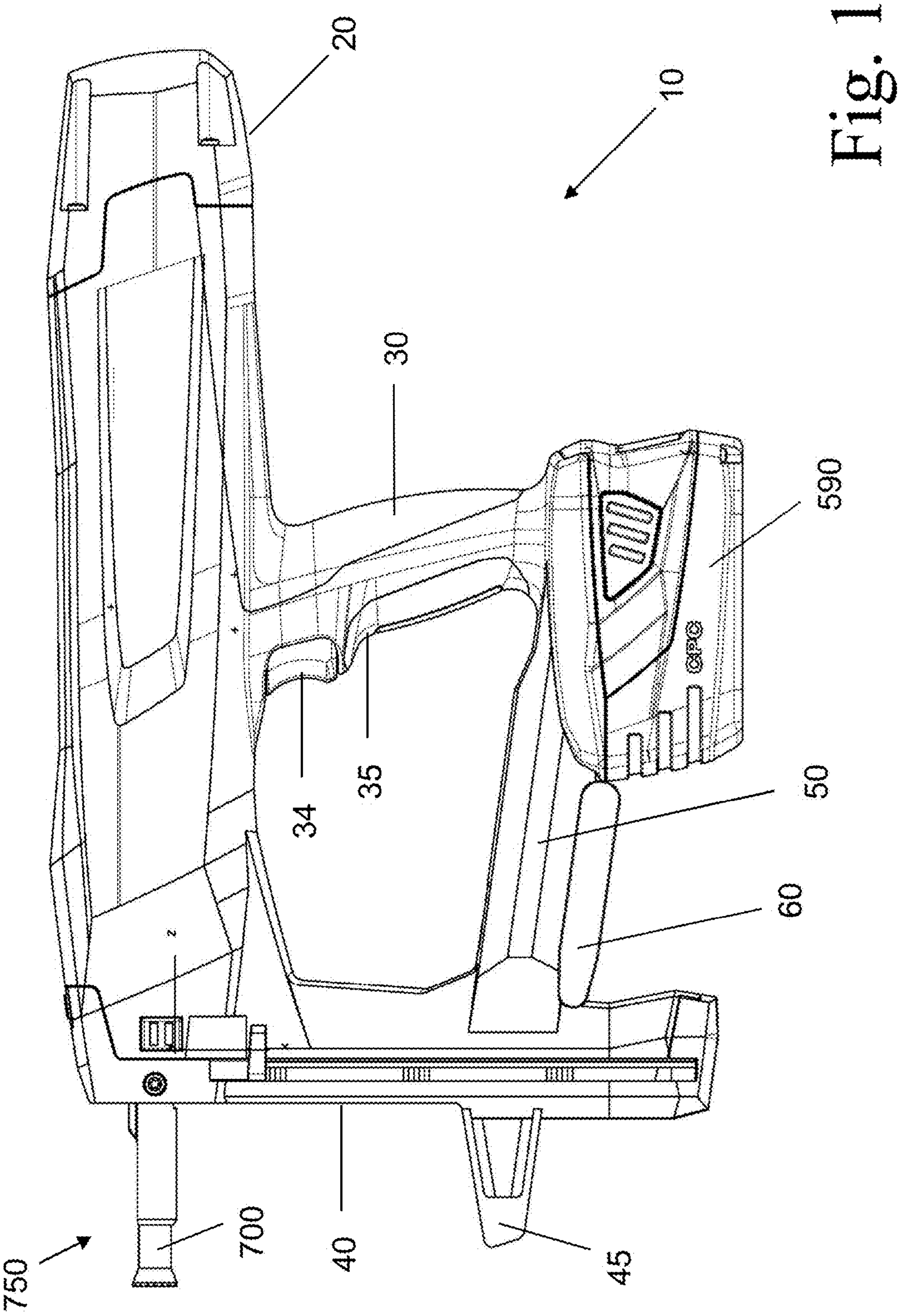
FIG. 1 shows a side view of a driving apparatus.

FIG. 1 shows in a side view a driving apparatus 10 for driving a fastening element, for example a nail or bolt, into a base material. The driving apparatus 10 has a driving element (not represented) for transmitting energy to the fastening element and also a housing 20 containing the driving element and a power unit (likewise not represented) for conveying the driving element.

The driving apparatus 10 also has a handle 30, a magazine 40 and a bridge 50 connecting the handle 30 to the magazine 40. Attached to the bridge 50 are a scaffold hook 60 for suspending the driving apparatus 10 on a scaffold or the like, and an electrical energy store designed as an electrical storage battery 590. On the handle 30, a trigger 34 and a grip sensor designed as a hand switch 35 are arranged. Furthermore, the driving apparatus 10 has a guide channel 700 for guiding the fastening element and a pressing device 750 for detecting a distance of the driving apparatus 10 from a base material (not represented). Aligning the driving apparatus perpendicularly to a base material is assisted by an alignment aid 45.

Figure 2:
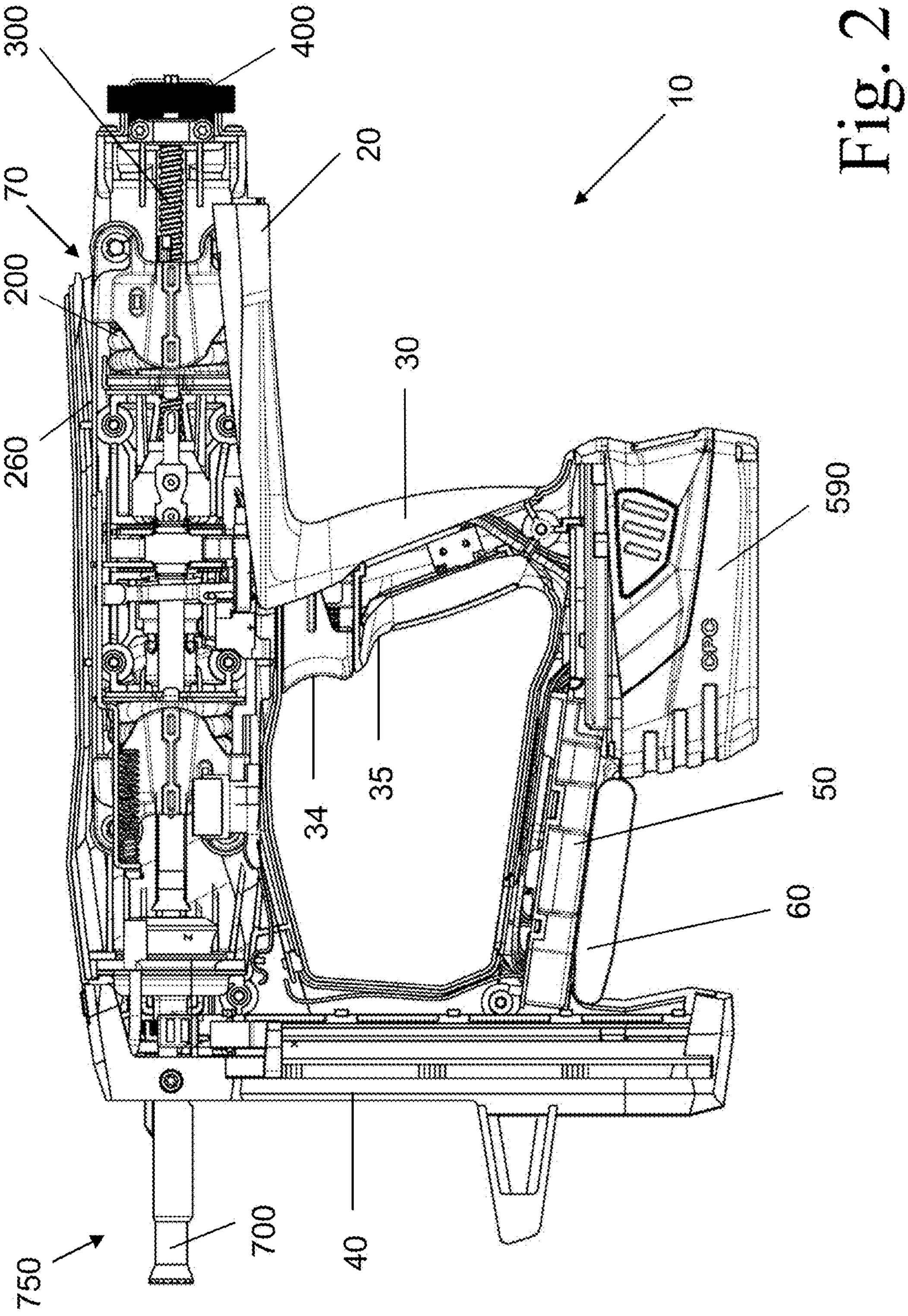
FIG. 2 shows a side view of the driving apparatus with an opened housing.

FIG. 2 shows the driving apparatus 10 with an opened housing 20. The housing 20 contains a power unit 70 for conveying a driving element 71. The power unit 70 comprises an electric motor (not represented) for converting electrical energy from the storage battery 590 into rotational energy, a torque transmission device comprising a gear mechanism 400 for transmitting a torque of the electric motor to a motion converter formed as a spindle drive 300, a force transmission device comprising a roller train 260 for transmitting a force from the motion converter to a mechanical energy store formed as a spring 200 and for transmitting a force from the spring 200 to the energy transmission element.

Figure 3:
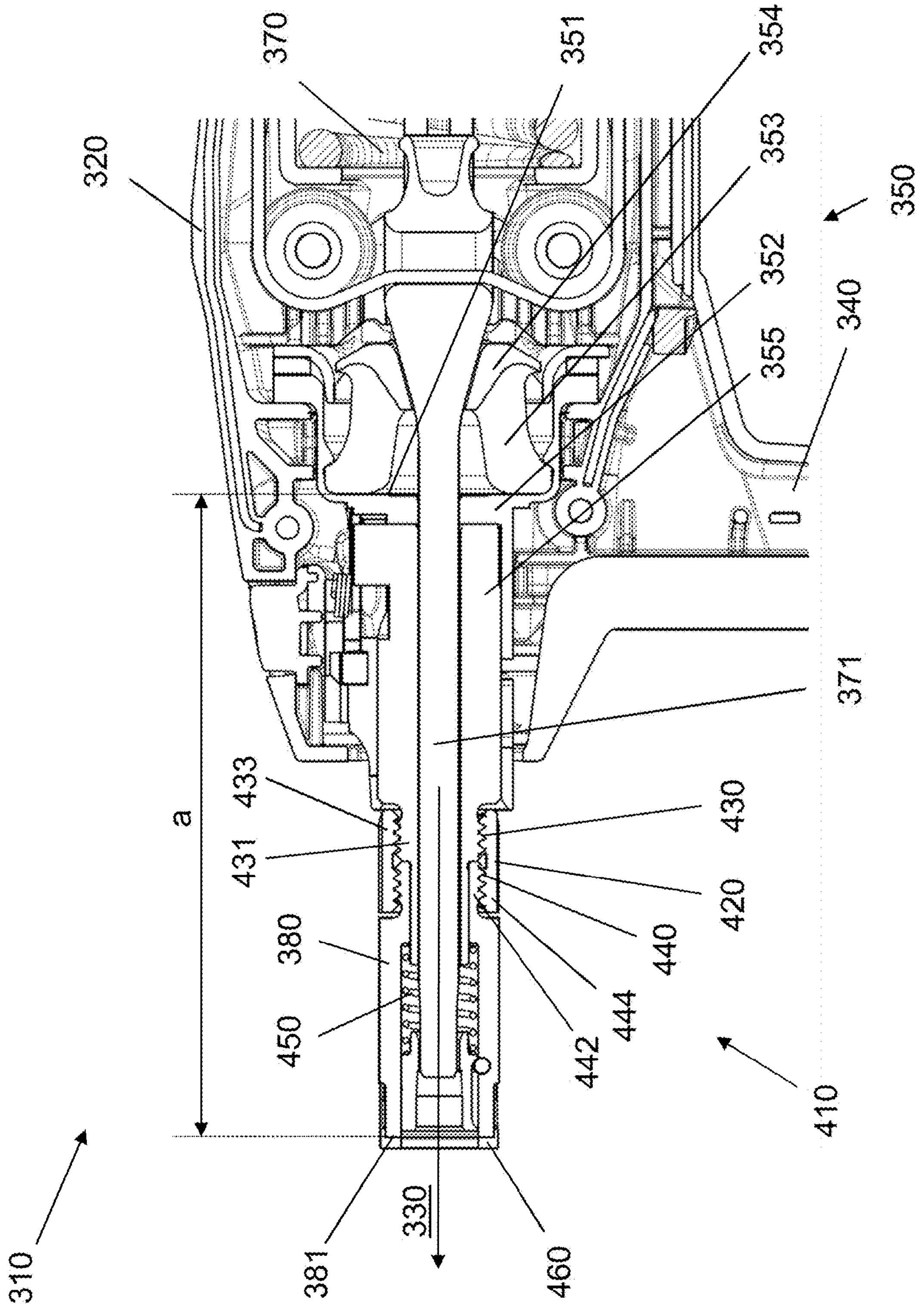
FIG. 3 shows a longitudinal section of part of a driving apparatus in a first setting.
Figure 4:
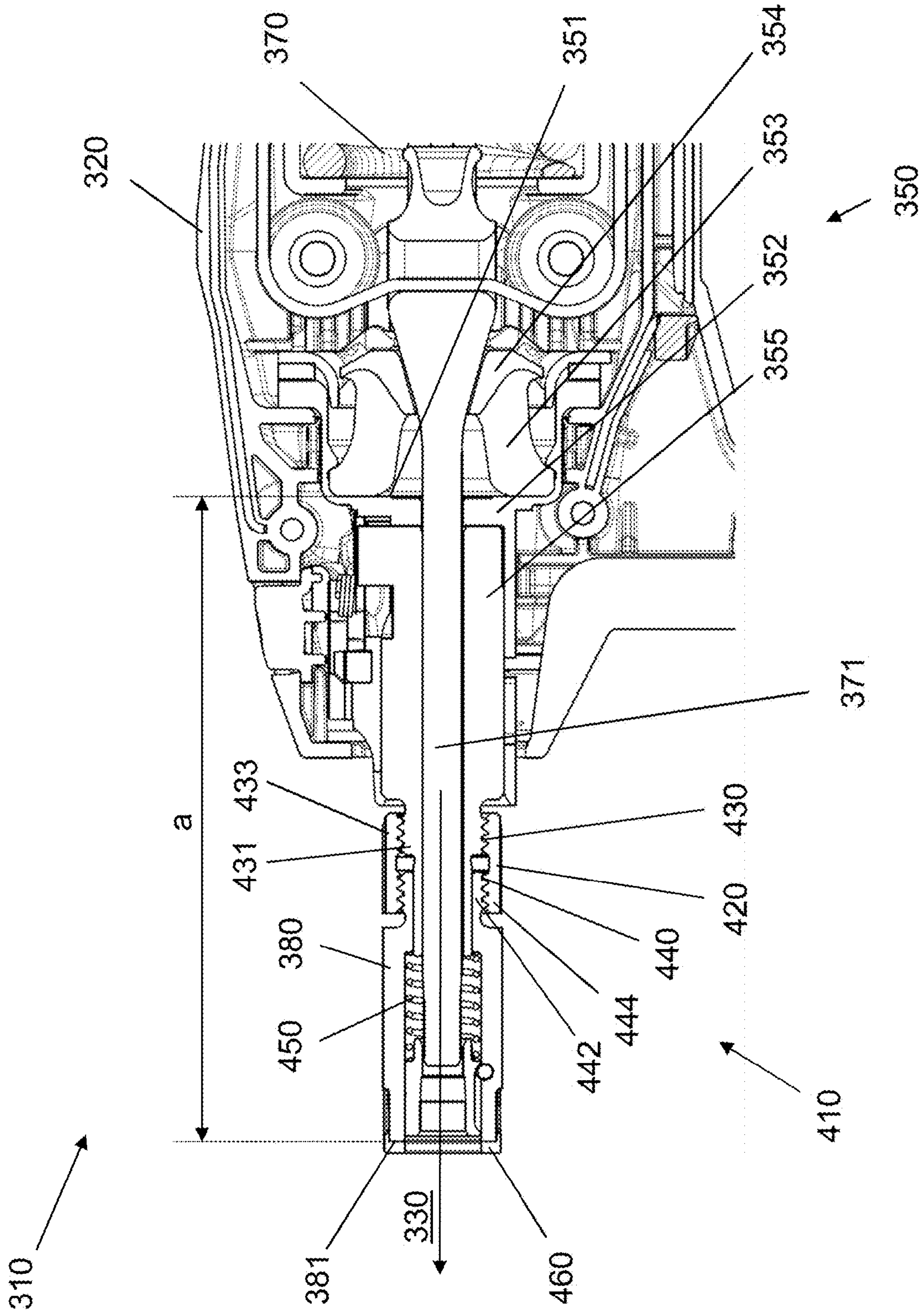
FIG. 4 shows a longitudinal section of part of the driving apparatus in a second setting.

FIGS. 3 and 4 show a driving apparatus 310 with a housing 320 and a magazine 340, partially in a longitudinal section. The driving apparatus 310 comprises a power unit 370 and a driving element 371 which is designed as a piston and is driven by the power unit 370 in a driving direction 330 from a starting position into a setting position in order to drive a fastening element into a base material. The driving apparatus 310 comprises a braking element 350 with a contact surface 351 which defines the setting position, illustrated in FIGS. 3 and 4, of the driving element 371. The braking element 350 has a holder 352 with the contact surface 351, a damping element 353, an impact element 354 and a sleeve element 355. At the end of a driving operation, the driving element 371 strikes against the impact element 354 and is braked in a manner damped by means of the damping element 353. The impact element 354 is composed of a rigid material, such as, for example, steel, and the damping element 353 is composed of an elastically highly deformable material, such as, for example, an elastomer. In the setting position, the driving element lies against the impact element 354, as shown in FIGS. 3 and 4. In exemplary embodiments which are not shown, the driving element lies against the contact surface in the setting position.

The driving apparatus 310 furthermore comprises a pressing element 380 which has an end surface 381 which can be pressed in the driving direction 330 against the base material. In the driving direction 330, the end surface 381 and the contact surface 351 are at a distance a from each other which defines a driving depth of the fastening element into the base material since the end surface 381 lies against the base material during the driving operation and the contact surface 351 defines the setting position of the driving element 371. Said distance can be adjusted by means of an adjustment device 410. The adjustment device 410 comprises an adjusting element 420 which is connected by means of a first threaded connection 430 to the sleeve element 355 of the braking element 350 and by means of a second threaded connection 440 to the pressing element 380. The first threaded connection 430 and the second threaded connection 440 each have a thread axis which is oriented in the driving direction 330.

Owing to the first threaded connection 430, rotation of the adjusting element 420 brings about an offset of the adjusting element 420 relative to the braking element 350. Owing to the second threaded connection 440, rotation of the adjusting element 420 brings about an offset of the adjusting element 420 relative to the pressing element 380. The first threaded connection 430 has a right-handed thread whereas the second threaded connection 440 has a left-handed thread. As a result, rotation of the adjusting element 420 all in all brings about an offset of the pressing element 350 relative to the braking element 380. A simple adjustment of the distance between the setting position and the base material is thereby made possible. A thread pitch of the first threaded connection 430 and of the second threaded connection 440 is identical here. In exemplary embodiments which are not shown, the first threaded connection has a left-handed thread and the second threaded connection has a right-handed thread, or the thread pitches of the first and the second threaded connection differ from each other with the thread orientation being the same or opposite.

As illustrated in FIGS. 3 and 4, the first threaded connection 430 has a first internal thread 431 and a first external thread 433. In addition, the second threaded connection 440 has a second internal thread 442 and a second external thread 444. The adjusting element 420 is designed as a threaded sleeve which has the first external thread 433 and the second external thread 444 and is therefore screwed onto the braking element 350 or onto the pressing element 380.

The driving apparatus 310 furthermore comprises a pressing sensor 450 which protrudes beyond the pressing element 380 and the end surface 381 thereof in the driving direction 330 and thereby is the first to come into contact with the base material when the driving apparatus 310 is pressed in the driving direction 330 against the base material. The pressing sensor 450 can be offset relative to the housing 320 in and counter to the driving direction 330 between a starting position and a pressing position. By means of a pressing spring 460, the pressing sensor 450 is preloaded into the starting position illustrated in FIGS. 3 and 4. When the driving apparatus 310 is pressed against the base material, the pressing sensor is in the pressing position in which a driving operation of the driving apparatus 310 is enabled. When the driving apparatus 310 is not pressed against the base material, the pressing sensor is in the starting position which is illustrated in FIGS. 3 and 4 and in which a driving operation is blocked. In exemplary embodiments which are not shown, the pressing sensor is formed by the pressing element.

In FIG. 3, the adjustment device 410 is in a position at a smallest possible distance a between the end surface 381 and the contact surface 351 and therefore at the greatest possible driving depth. In this position, the sleeve element 355 and the pressing element 380 lie against each other, as a result of which an adjustment travel of the adjustment device 410 and therefore the driving depth are delimited upward. By contrast, in FIG. 4, the adjustment device 410 is in a position at a greatest possible distance a between the end surface 381 and the contact surface 351 and therefore at the smallest possible driving depth. The adjusting element 420 is latched by means of a latching apparatus, not illustrated specifically, in this position, and preferably in one or more intermediate positions.

The invention has been explained above on the basis of a number of exemplary embodiments of a driving apparatus. The features described can be transferred individually or in combination from each exemplary embodiment to all other exemplary embodiments as long as they do not contradict one another. It should be noted that the apparatus according to the invention can also be used for other purposes.

The invention claimed is:

1. An apparatus for driving a fastening element into a base material, comprising a power unit and a driving element which is driven by the power unit in a driving direction from a starting position into a setting position to drive a fastening element into the base material, furthermore comprising a braking element comprising a holder with a contact surface which defines the setting position of the driving element and against which the driving element lies, the braking element further comprising a damping element and an impact element, wherein at the end of driving the fastening element into the base material, the driving element strikes against the impact element and is braked in a manner damped by the damping element, the apparatus furthermore comprising a pressing element which has an end surface which can be pressed in the driving direction onto the base material, wherein, in the driving direction, the end surface and the contact surface are at a distance from each other which defines a driving depth of the fastening element into the base material, furthermore comprising an adjustment device with which the distance between the end surface and the contact surface can be adjusted, wherein the adjustment device comprises an adjusting element comprising a threaded sleeve having a first external thread and a second external thread, the adjustment element being screwed on to the braking element by a first threaded connection, and by a second threaded connection to the pressing element, wherein the first threaded connection has a right-handed thread and the second threaded connection has a left-handed thread, such that, owing to the first threaded connection having the right-handed thread, rotation of the adjusting element offsets the adjusting element relative to the braking element and, owing to the second threaded connection having the left-handed thread, rotation of the adjusting element offsets the adjusting element relative to the pressing element, and therefore rotation of the adjusting element offsets the pressing element relative to the braking element.

2. The apparatus as claimed in claim 1, wherein a thread axis of the first threaded connection is oriented in the driving direction.

3. The apparatus as claimed in claim 2, wherein a thread axis of the second threaded connection is oriented in the driving direction.

4. The apparatus as claimed in claim 2, wherein the first threaded connection has a first thread pitch, and wherein the second threaded connection has a second thread pitch which differs from the first thread pitch.

5. The apparatus as claimed in claim 1, wherein a thread axis of the second threaded connection is oriented in the driving direction.

6. The apparatus as claimed in claim 5, wherein the first threaded connection has a first thread pitch, and wherein the second threaded connection has a second thread pitch which differs from the first thread pitch.

7. The apparatus as claimed in claim 1, wherein the first threaded connection has a right-handed thread and the second threaded connection has a left-handed thread.

8. The apparatus as claimed in claim 1, wherein the first threaded connection has a first thread pitch, and wherein the second threaded connection has a second thread pitch which differs from the first thread pitch.

9. The apparatus as claimed in claim 1, wherein the first threaded connection has a first internal thread and a first external thread, and wherein the second threaded connection has a second internal thread and a second external thread.

10. The apparatus as claimed in claim 9, wherein the adjusting element has the first external thread and/or the second external thread.

11. The apparatus as claimed in claim 1, wherein the adjusting element is designed as a threaded sleeve which is screwed onto the braking element and onto the pressing element.

12. The apparatus as claimed in claim 1, furthermore comprising a housing and a pressing sensor which comes into contact with the base material only when the apparatus is pressed in the driving direction against the base material and which can be offset relative to the housing counter to the driving direction between a starting position and a pressing position, wherein the pressing sensor is in the starting position when the apparatus is not pressed against the base material, and wherein the pressing sensor is in the pressing position when the apparatus is pressed against the base material.

13. The apparatus as claimed in claim 12, wherein the pressing sensor in the starting position protrudes beyond the pressing element in the driving direction.

14. The apparatus as claimed in claim 12, wherein the pressing sensor is formed by the pressing element.

15. The apparatus as claimed in claim 1, wherein the power unit comprises a potential energy store, for storing potential energy, by which the driving element is driven, and an energy transmission device for transmitting energy from an energy source to the potential energy store.

* * * * *